United States Patent [19]

Weaver et al.

[11] 4,127,629
[45] Nov. 28, 1978

[54] PROCESS OF FORMING SILICON CARBIDE BODIES

[75] Inventors: Gerald Q. Weaver, Princeton; John C. Logan, Auburn, both of Mass.

[73] Assignee: Norton Company, Worcester, Mass.

[21] Appl. No.: 755,947

[22] Filed: Dec. 30, 1976

Related U.S. Application Data

[63] Continuation-in-part of Ser. No. 599,386, Jul. 28, 1976, abandoned.

[51] Int. Cl.$^2$ .............................................. C04B 35/56
[52] U.S. Cl. ........................................ 264/63; 106/44; 264/86; 264/221; 264/317
[58] Field of Search ........... 264/68, 86, 317, DIG. 44, 264/221, 63, 332, 313; 106/44

[56] References Cited

U.S. PATENT DOCUMENTS

| | | | |
|---|---|---|---|
| 2,303,303 | 11/1942 | Schliecher | 264/86 |
| 2,527,390 | 10/1950 | Blaha | 106/44 |
| 2,964,823 | 12/1960 | Fredrickson | 264/65 |
| 3,383,444 | 5/1968 | Loyet | 264/86 |
| 3,549,473 | 12/1970 | Le Blanc | 264/63 |
| 3,673,293 | 6/1972 | Teague | 264/86 |
| 4,017,433 | 4/1977 | Farrington et al. | 264/63 |
| 4,041,117 | 8/1977 | Prochazka | 264/63 |

FOREIGN PATENT DOCUMENTS 2,234,924  1/1974  Fed. Rep. of Germany ............. 106/44

*Primary Examiner*—Robert F. White
*Assistant Examiner*—John A. Parrish
*Attorney, Agent, or Firm*—Oliver W. Hayes

[57] ABSTRACT

A castable slip of a bimodal distribution of silicon carbide particles is prepared, the slip preferably containing a water miscible curable resin. A shaped body is cast in a plaster of paris mold which also preferably contains a small amount of a water soluble polymer. The casting and mold are then heat treated to increase the strength of the green casting. In a preferred embodiment of the invention the resin in the slip is cured by the heat treating step. The mold is then removed by decomposing the mold material, preferably by dipping the mold in acid to attack the mold material (e.g. the water soluble polymer or the plaster of paris itself). The cured resin in the casting is sufficiently resistant to attack by the acid to survive the mold removal. In an alternative embodiment the silicon carbide body is heated to a sufficiently high temperature (e.g. 650°–750° C) to slightly oxidize the SiC and to strengthen the green casting. Along with this heating the water soluble polymer in the mold is burned out and the mold is thereby weakened to permit its ready removal. Thereafter, the cast silicon carbide product is fired to carbonize any resin in the SiC and recrystallize the silicon carbide. The product is then preferably siliconized to react all of the carbon remaining from the resin and any additional carbon that may be added after recrystallization of the silicon carbide.

4 Claims, No Drawings

PROCESS OF FORMING SILICON CARBIDE BODIES

RELATED APPLICATION

This application is a continuation of co-pending application Ser. No. 599,386 filed July 28, 1976 now abandoned.

BACKGROUND OF THE INVENTION

In the formation of intricate cast shapes of silicon carbide having delicate, thin, complex, curved surfaces, it is desirable to utilize a mold such as plaster of paris which can be conveniently formed by known processes. In employing such a mold it is desirable to use a slip cast technique as described in Fredriksson U.S. Pat. No. 2,964,823. However, the green product formed by slip casting silicon carbide is relatively fragile and, in a complex mold system, it is extremely difficult to remove the mold without harming the green casting or it can be very costly to make a multipiece mold. In the present invention this difficulty is overcome in several ways, preferably by providing in the slip casting mix a water miscible resin which can be cured by firing the mold (and the cast shape) to a relatively low temperature. Alternatively the mold and silicon carbide slip casting are heated to a temperature in excess of about 600° C. for a sufficiently long time to oxidize the silicon carbide and thereby substantially increase the green strength of the casting. Thereafter, the mold and the cured casting are subjected to an acid bath which destroys the plaster of paris in the mold and frees the casting for subsequent treatment. Alternatively, or additionally, the plaster mold may be treated by incorporating in the plaster of paris mold mix 10–15% (by weight) of an aqueous solution which contains about 1 to 5% (by weight) of an organic polymer and the mold is heated in a oxygen-containing atmosphere to a sufficiently high temperature to burn out a substantial portion of the polymer in the mold and thereby drastically weaken the mold to permit its ready removal from the green casting.

PRIOR ART

Recrystallization of silicon carbide powder to form high temperature elements goes back at least 75 years to the old U.S. Pat. No. 650,234 to Fitzgerald. A number of patents to Tone (such as U.S. Pat. Nos. 913,324 and 1,013,701) show the siliconization of silicon carbide. Similarly the Hutchins U.S. Pat. No. 1,266,478 shows the in situ formation of silicon carbide in a body by reaction between silicon and carbon incorporated in the body. Fredriksson U.S. Pat. No. 2,964,823 shows the slip-casting of silicon carbide bodies which can then be fired to recrystallization temperature. The Johnson U.S. Pat. No. 3,079,273 shows the formation of objects from a mixture of silicon carbide, graphite and polymeric plastic. The objects are molded from the plastic and joined by part of the same mix and then fired at an elevated temperature to carbonize the plastic and siliconize the carbon contained in the mixture. Alliegro U.S. Pat. No. 3,482,791 describes the slip casting of a silicon carbide refiner plate which is then siliconized to increase its impermeability.

In Schleicher U.S. Pat. No. 2,303,303 there is described a decomposable slip casting mold containing wood flour which can be burned out to weaken the mold.

LeBlanc et al U.S. Pat. No. 3,549,473 describes the addition of organic resin to a ceramic. There is a similar disclosure in the old U.S. Pat. No. 1,450,140 to Danahower. These latter two patents do not relate to slip casting, however.

GENERAL DESCRIPTION OF THE INVENTION

In general a castible slip of a biomodal distribution of silicon carbide particles is prepared. The slip is then cast into a plaster of paris mold which can be ultimately destroyed to permit its removal from the green casting. Prior to the removal of the mold from the casting, the green casting is partially strengthened in one of several ways. In one method a curable resin is added to the slip and this curable resin is cured prior to removal from the mold. In another method of strengthening the green casting it is heated, while still in the mold, to temperatures sufficiently high to slightly oxidize the silicon carbide and thereby form a glassy bond which strengthens the green casting.

The mold can be weakened in several ways to permit ready removal from the strengthened green casting. In one method it can be immersed in acid or some other medium which attacks the plaster of paris itself. In still another method of forming a decomposable mold a water soluble polymer may be added to the plaster of paris, this polymer being subsequently burned out of the mold at an elevated temperature. This drastically weakens the mold so it can be brushed away from the green casting.

The plaster of paris is preferably treated, at least on its inner surface which contacts the slip, so as to appreciably slow down the absorption of water from the slip to permit complete filling of the mold, this being particularly important when very thin sections, such as airfoils of turbine blades and the like, are to be formed. The curable or otherwise settable resin preferably is one which is cured or set at a relatively low temperature on the order of 200° C. or less and one which, when cured, has sufficient resistance to attack by hydrochloric acid, for example, so as to readily survive the mold-removing bath.

The green product removed from the mold is preferably fired to a sufficiently elevated temperature to re-crystallize the silicon carbide and form a relatively rugged structure. This product will have some residual carbon remaining after the firing operation due to the decomposition of the resin binder. Where a fairly dense product is desired, additional carbon can be provided in the interstices of the relatively porous recrystallized silicon carbide structure by utilizing furfuryl alcohol, as described in Heyroth U.S. Pat. Nos. 2,431,326 or Taylor 3,205,043. As the final step in the preparation of the product, the carbon-containing porous silicon carbide is fired in a silicon-containing atmosphere at a temperature on the order of 2000° C. to convert all of the contained carbon to silicon carbide and, if desired, to completely impregnate the body with free silicon.

DETAILED DESCRIPTION OF THE INVENTION

In one preferred embodiment of the invention a set of turbine wheel blades is cast as set forth in the following non-limiting example.

EXAMPLE 1

Exact wax replicas of the final turbine wheel blades were prepared by suitable molding techniques and these were used as the forms around which plaster of paris molds were then formed. The wax used for the initial bodies was typically a jewelry pattern wax obtained from Freeman Manufacturing Company under the tradename JW 3715-H and was injected at about 150° F., 10 p.s.i. After the plaster of paris was hardened the molds were heated to 120° F. to melt out the wax, thus leaving a thin coating of wax on all of the interior surfaces of the plaster of paris and appreciably decreasing the absorption of the surfaces for water from the casting slip.

A slip for casting was prepared from the following mixture.

| | |
|---|---|
| fine silicon carbide average particle size 2.5 to 3 micron | 5833 grams |
| coarse silicon carbide - 200 mesh | 5600 grams |
| water | 2500 grams |
| sodium silicate | 25 grams |

The mixture was tumbled in a plastic milling jar with 2.5 centimeter diameter rubber balls for 16 hours. The final slip was prepared by adding to this milled mixture, 698 grams of a liquid resole resin Varcum 5137 (manufactured by Reichhold Chemicals, Inc.) and milling this combination for one hour. The slip was then poured into the plaster of paris molds preferably through a bottom sprue, the slip being allowed to pass completely through each mold into a sprue extending from the top thereof. When it appeared that the molds were completely filled, the slip was put under a gas pressure of about 20 p.s.i. and maintained for 45 minutes to make sure that all parts of the molds were completely filled. Thereafter the pressure was removed after the slip had solidified in each mold. The molds and the solidified slips were then heated to 90° C. for 24 hours and 180° C. for 2 hours to cure the phenolic resin. Thereafter the molds containing the cured resin castings were placed in a bath of boiling 50% hydrochloric acid for 5 minutes. This acid bath attacked the molds so that after removal from the bath and washing with water the remnants of the molds could be easily brushed from the delicate green castings. Thereafter the piece was fired to about 1970° C. for 15 minutes to recrystallize the silicon carbide and carbonize the resin.

The blade shapes were then removed from the oven and were treated with a polymerizable furfuryl alcohol based material, by impregnating with a solution of FA-PREG P5 (Quaker Oats Co.) for 2 hours at room temperature, cured at 90° C. for 24 hours and 250° C. for 2 hours. This process was repeated twice, leaving the pieces essentially free of void areas.

The pieces were then fired in a furnace having a silicon atmosphere at about 2070° C. for about 30 minutes to convert essentially all of the carbon in the products to silicon carbide. The firing also permitted an additional amount of silicon to be absorbed in the products so that the final products contained ~ 12% elemental silicon.

EXAMPLE 2

A monolithic ceramic turbine rotor was formed by casting a slip essentially the same as that of Example 1, into a plaster of paris mold of a turbine rotor shape. The slip was cast and processed as described above and the mold was removed from the set green shape, by boiling in hydrochloric acid. The subsequent recrystallization and siliconizing steps were carried out in the manner of Example 1.

While one preferred method of increasing the density of the product by the use of furfuryl alcohol as described in the Heyroth U.S. Pat. Nos. 2,431,326 and Taylor 3,205,043, other methods of precipitating carbon in the recrystallized silicon carbide body can be employed.

A preferred resin for curing in the original slip is described above as being a liquid resole phenolic resin, but solid powdered phenolic resins such as "Varcum" 29346, are equally suitable. Union Carbide Corporation's BRP-5417 and BRP-5980, Borden Chemical Company's 5164, and Ashland Chemical Company's resin 890, are equally suitable. Almost any of the numerous organic polymers commercially available, that cure or at least set to a solid state and are resistant to boiling acid for a short period of time, are operable. Resorcinol-formaldehyde or alkyd resins can be substituted for the phenol-formaldehyde resole utilized in the example above. Polymers such as melamineformaldehyde, urea-formaldehyde, epoxy, polyester, and the like, may also be used but these are employed with much more difficulty. Some of these materials have a drastic effect on the pH of the slip, so that if manipulation of the pH is not done, the addition of one of these resins, e.g. an amine-epoxy system, will cause the pH to increase so substantially that the viscosity of the slip increases to the point where the slip will no longer cast properly.

Similarly a lacquer, such as L-18 Clear Lacquer sold by Raffi and Swanson Inc., can be used to coat the interior of the plaster of paris mold and reagents other than hydrochloric can be used to decompose the plaster of paris mold.

In the preceding discussion the plaster of paris mold was dissolved from the slip casting by the use of hydrochloric acid. It is often desirable that the material of the mold be relatively soft to prevent its exerting stresses on the cast piece during the heat treating of the cast piece to give it additional green strength. In order to obtain such a relatively soft mold a procedure has been developed which involves adding a solution of an organic polymer to the plaster slip just before the mold is cast. In the preferred embodiment of the invention this organic polymer is methylcellulose, sold under the trademark Methocel.

The introduction of methylcellulose causes the formation of very fine bubbles in the plaster of paris mix which subsequently causes porosity in the final plaster casting. Because these bubbles are extremely small and well distributed they form a smooth surfaced, but porous, soft plaster which can be easily decomposed. The methylcellulose serves a second function and that is the suspension of undissolved plaster particles. If one were to use the same plaster to water ratios, without the methylcellulose, as can be used with the methylcellulose the plaster would tend to settle a great deal.

In the course of working with the methylcellulose it was found that the amount of methylcellulose could be changed considerably. When the high concentrations of the methylcellulose are used it can serve as a combustible component in the plaster of paris mix which, when burned out, drastically weakens the plaster of paris mold. An example of the use of methylcellulose is given in the following nonlimiting example:

EXAMPLE 3

200 grams of plaster of paris is added to 2 grams of water. This is mixed for 3 minutes and then a pinch of already set plaster which has been ground up is added to cause more rapid setting. Mixing is continued for 9 minutes and thereafter a methylcellulose solution is added for an additional mixing time of 2 minutes. Thereafter the mix is poured to form a plaster of paris mold. The amount of methylcellulose may vary from 0.1% to 4%, by weight this amount being added in the form of a methylcellulose solution whose concentration varies from about 1% to 8% methylcellulose. The upper concentration of methylcellulose is reached when the mold shrinks excessively during drying. In general, 10 to 15% of a 2% methylcellulose solution is quite satisfactory, particularly when the plaster of paris mold is to be decomposed by acid leaching. When the plaster of paris mold is to be decomposed by burning it is preferred that a somewhat higher concentration of the methylcellulose be utilized.

To burn out the polymer, the mold with the silicon carbide slip casting is heated from room temperature to about 650° to 700° C. over a time schedule of 15° C. per hour. After cooling back to room temperature the plaster mold is extremely soft and may be easily brushed from the piece. During this eating cycle the silicon carbide green casting is slightly oxidized to form a glassy phase which substantially increases the strength of the green casting.

While one type of water soluble organic polymer has been described above numerous others may be employed which can be either decomposed by acid or can be burned out to weaken the casting. Examples of such additional organic polymers are; carboxyvinyl polymers of the type sold by B. F. Goodrich under the trademark Carbopol 934, xanthan gums as sold by Kelco Company under the trademark Kelzon or an ammonium alginate as sold by Kelco Company under the trademark Superloid.

Although a plaster of paris mold is preferred, since the technology for its use is highly developed, other types of molds can also be employed, particularly where a water soluble organic polymer is utilized to provide additional porosity.

It should be noted, that although the foregoing description of the invention is presented within the context of forming thin walled, delicate, and complex shapes, this is not to be construed as a limitation. The invention process is also applicable to forming large and small, thin and thick, complex and simple shapes.

Likewise, the examples set out above utilize silicon carbide, but the process can be used with silicon metal powder, for example, which may then be nitrided as taught by E. R. W. May in U.S. Pat. No. 3,819,786 or by N. L. Parr et al in U.S. Pat. No. 3,222,438. The methods described herein are also amenable to forming intricate shapes of other powdered refractory materials such as silicon nitride, aluminum oxide, composites of silicon carbide and silicon nitride, and the like when a curable resin is used to give green strength to the casting. Any refractory compound powder that oxidizes slightly to form a stable glass (e.g. $B_2O_3$, $SiO_2$ or $TiO_2$) to strengthen the green casting can be used when the green casting is strengthened by heating in air.

What is claimed is:

1. A process for casting a complex silicon carbide shape which requires destruction of the mold to permit removal of the complex cast shape, said process including the steps of forming a castable aqueous slip from particles of finely powdered silicon carbide, said slip containing approximately 1 to 10% of a water miscible resin that will set or cure at a temperature below 200° C. to a structure that is relatively inert to an acid, casting said slip into a plaster mold which is attacked by said acid, heat treating the mold and cast slip to cure said resin and increase the green strength of the casting, decomposing the plaster mold by treating with said acid to facilitate removal of the mold from the strengthened casting, the curing step imparting substantial strength to the green casting so that the cured green casting is stronger than the acid treated mold, removing the decomposed mold to free the green casting and further firing the casting.

2. The process of forming a silicon carbide body having thin delicate sections which comprises forming a castable slip of a bimodal mixture of silicon carbide fine particles, a portion of said particles having an average size on the order of 3 microns and another portion of said particles having an average size of less than about 200 mesh, preparing an aqueous plaster mold mix by incorporating in the plaster mold mix 0.1 to 4% (by weight) of an organic polymer, said polymer being in an aqueous solution and having the property of forming very fine bubbles in the plaster mix and also of maintaining the plaster particles suspended in the aqueous mix in dilutions where the particles would normally settle, preparing a mold having a smooth porous surface from said plaster mix, casting said slip into the porous plaster mold, solidifying the slip in the mold, heating the mold and the casting to a temperature in excess of 600° C in an oxidizing atmosphere for a sufficiently long time to partially oxidize the silicon carbide and thereby substantially increase the green strength of the casting by forming a glassy bond for the silicon carbide, the heating step also serving to oxidize the polymer in the mold to decompose the mold sufficiently so that it can be readily brushed from the green silicon carbide casting.

3. A process for casting a complex refractory shape which requires destruction of the mold to permit removal of the complex cast shape, said process including the steps of forming a castable aqueous slip from particles of finely powdered refractory material said slip containing approximately 1 to 10% of a water miscible resin that will set or cure at a temperature below 200° C. to a structure that is relatively inert to an acid, casting said slip into a plaster mold which is attacked by said acid, heat treating the mold and cast slip to cure said resin and increase the green strength of the casting, decomposing the plaster mold by treating with said acid to facilitate removal of the mold from the strengthened casting, the curing step imparting substantial strength to the green casting so that the cured green casting is stronger than the acid treated mold, removing the decomposed mold to free the green casting and further heat treating the casting by firing the green casting.

4. A process for casting a complex refractory shape which requires destruction of the mold to permit removal of the complex cast shape, said process including the steps of forming a castable aqueous slip from particles of a mixture of powdered refractory material, a portion of said particles being silicon carbide having an average size on the order of 3 microns and another portion of said particles having an average size of less than about 200 mesh, preparing an aqueous plaster mold mix by incorporating in the plaster mold mix 0.1 to 4%

(by weight) of an organic polymer, said polymer being in an aqueous solution and having the property of forming very fine bubbles in the plaster mix and also of maintaining the plaster particles suspended in the aqueous mix in dilutions where the particles would normally settle, preparing a mold having a smooth porous surface from said plaster mix, casting said slip into the porous plaster mold, solidifying the slip in the mold, heating the mold and the casting to a temperature in excess of 600° C in an oxidizing atmosphere for a sufficiently long time to partially oxidize the fine silicon carbide and thereby substantially increase the green strength of the casting by forming a glassy bond for the silicon carbide, the heating step also serving to oxidize the polymer in the mold to decompose the mold sufficiently so that it can be readily brushed from the green silicon carbide casting.

* * * * *